US009989967B2

(12) United States Patent
Jacobus et al.

(10) Patent No.: US 9,989,967 B2
(45) Date of Patent: Jun. 5, 2018

(54) ALL WEATHER AUTONOMOUSLY DRIVEN VEHICLES (71) Applicant: Cybernet Systems Corporation, Ann Arbor, MI (US)

(72) Inventors: Charles J. Jacobus, Ann Arbor, MI (US); Douglas Haanpaa, Dexter, MI (US)

( * ) Notice: Subject to any disclaimer, the term of this patent is extended or adjusted under 35 U.S.C. 154(b) by 0 days. days.

(21) Appl. No.: 14/196,189

(22) Filed: Mar. 4, 2014

(65) Prior Publication Data
US 2015/0253775 A1    Sep. 10, 2015

(51) Int. Cl.
*G05D 1/02*    (2006.01)
*G01S 17/89*    (2006.01)
(Continued)

(52) U.S. Cl.
CPC .............. *G05D 1/024* (2013.01); *G01S 7/487* (2013.01); *G01S 7/4808* (2013.01); *G01S 7/497* (2013.01);
(Continued)

(58) Field of Classification Search
CPC .... G05D 1/024; G05D 1/0246; G01S 7/4808; G01S 7/487; G01S 7/497; G01S 17/89; G01S 17/936; G01S 13/89; G01S 13/931
(Continued)

(56) References Cited

U.S. PATENT DOCUMENTS 3,610,703 A * 10/1971 Slavin et al. ................. 303/159
5,812,395 A     9/1998 Masciangelo et al.
(Continued)

FOREIGN PATENT DOCUMENTS

DE  102004047214  3/2006
EP  0712697        5/1996
EP  0800129        4/1997

OTHER PUBLICATIONS

King-Hele, D., "Erasmus Darwin's Improved Design for Steering Carriages and Cars," *Notes and Records of the Royal Society of London*, 56(1): 41-62, Jan. 2002.
(Continued)

*Primary Examiner* — Behrang Badii
*Assistant Examiner* — Daniel L Greene
(74) *Attorney, Agent, or Firm* — John G. Posa; Belzer PC (57) ABSTRACT Autonomously driven vehicles operate in rain, snow and other adverse weather conditions. An on-board vehicle sensor has a beam with a diameter that is only intermittently blocked by rain, snow, dust or other obscurant particles. This allows an obstacle detection processor is to tell the difference between obstacles, terrain variations and obscurant particles, thereby enabling the vehicle driving control unit to disregard the presence of obscurant particles along the route taken by the vehicle. The sensor may form part of a LADAR or RADAR system or a video camera. The obstacle detection processor may receive time-spaced frames divided into cells or pixels, whereby groups of connected cells or pixels and/or cells or pixels that persist over longer periods of time are interpreted to be obstacles or terrain variations. The system may further including an input for receiving weather-specific configuration parameters to adjust the operation of the obstacle detection processor.

20 Claims, 7 Drawing Sheets (51) Int. Cl.
*G01S 17/93* (2006.01)
*G01S 7/48* (2006.01)
*G01S 7/487* (2006.01)
*G01S 7/497* (2006.01)
*G01S 13/89* (2006.01)
*G01S 13/93* (2006.01)

(52) U.S. Cl.
CPC ............ *G01S 17/89* (2013.01); *G01S 17/936* (2013.01); *G01S 13/89* (2013.01); *G01S 13/931* (2013.01); *G05D 1/0246* (2013.01)

(58) Field of Classification Search
USPC .................................................. 701/23, 301
See application file for complete search history.

(56) References Cited

U.S. PATENT DOCUMENTS

| | | | |
|---|---|---|---|
| 5,951,122 A * | 9/1999 | Murphy | ........................ 303/163 |
| 6,058,344 A | 5/2000 | Rowe et al. | |
| 6,324,461 B1 * | 11/2001 | Yamaguchi et al. | ............ 701/80 |
| 6,952,488 B2 | 10/2005 | Kelly et al. | |
| 7,376,262 B2 | 5/2008 | Hu et al. | |
| 7,440,585 B2 | 10/2008 | Roh et al. | |
| 7,826,919 B2 | 11/2010 | D'Andrea et al. | |
| 7,850,413 B2 | 12/2010 | Fontana | |
| 7,873,469 B2 | 1/2011 | D'Andrea et al. | |
| 7,894,932 B2 | 2/2011 | Mountz et al. | |
| 7,894,933 B2 | 2/2011 | Mountz et al. | |
| 7,912,574 B2 | 3/2011 | Wurman et al. | |
| 7,920,962 B2 | 4/2011 | D'Andrea et al. | |
| 8,068,978 B2 | 11/2011 | D'Andrea et al. | |
| 8,170,711 B2 | 5/2012 | D'Andrea et al. | |
| 8,220,710 B2 | 7/2012 | Hoffman et al. | |
| 8,265,873 B2 | 9/2012 | D'Andrea et al. | |
| 8,280,546 B2 | 10/2012 | D'Andrea et al. | |
| 8,280,547 B2 | 10/2012 | D'Andrea et al. | |
| 2004/0015266 A1 | 1/2004 | Skoog | |
| 2004/0093650 A1 | 5/2004 | Martins et al. | |
| 2007/0018811 A1 | 1/2007 | Gollu | |
| 2008/0027591 A1 * | 1/2008 | Lenser et al. | ...................... 701/2 |
| 2008/0262669 A1 | 10/2008 | Smid et al. | |
| 2010/0156758 A1 * | 6/2010 | Anders | ............................. 345/8 |
| 2011/0304498 A1 * | 12/2011 | Yanagihara | ............ G01S 7/412 342/70 |
| 2012/0001743 A1 * | 1/2012 | Cotten et al. | .................. 340/438 |
| 2012/0083982 A1 * | 4/2012 | Bonefas et al. | ................. 701/70 |
| 2012/0193889 A1 * | 8/2012 | Harrison | .................... 280/423.1 |
| 2013/0006484 A1 * | 1/2013 | Avitzur et al. | ................... 701/50 |
| 2014/0246257 A1 * | 9/2014 | Jacobsen et al. | ............. 180/14.2 |

OTHER PUBLICATIONS

Turk, M. et al., "VITS-A Vision System for Autonomous Land Vehicle Navigation." Pattern Analysis and Machine Intelligence, IEEE Transactions on 10.3 (1988): 342-361.

Carmer, D. et al., "Laser Radar in Robotics," Proceedings of the IEEE 84.2 (1996): 299-320.

Kelly, A. et al., "Rough Terrain Autonomous Mobility—part 2: An Active Vision, Predictive Control Approach," *Autonomous Robots* 5.2 (1998): 163-198.

Seelinger, M. et al., "Automatic Visual Guidance of a Forklift Engaging a Pallet," *Robotics and Autonomous Systems* 54.12 (2006): 1026-1038.

Tamba, T. et al., "A Path Following Control of an Unmanned Autonomous Forklift," *International Journal of Control, Automation and Systems* 7.1 (2009): 113-122.

Gehrig, S. et al., Priors for Stereo Vision under Adverse Weather Conditions, ICCV 2013 Workshop paper, Computer Vision Foundation, IEEE Explore, pp. 238-245.

* cited by examiner

Keep cells that are part of a larger connected component, label small components as obscurants

Vehicle passes through a deformable terrain and leaves tracks or ruts

Depth of rut, $d$

Width of rut, $w$

Next vehicle passes through the same terrain and sees these ruts as potentially negative obstacles if a $d$ or $w$ is too large

FIGURE 6

Reflective spots, like puddles generate false long range readings also or no return because light reflects away from the sensor Dark holes generate false long range readings

FIGURE 7

Both puddles and pot holes present a missing segment of ground terrain data due to reflectance light away from the sensor for puddles and due to sensor line of sight blockage for pot holes. Only the small lip at the far end of the pot hole which is not seen for a puddle differentiates the cases.

ALL WEATHER AUTONOMOUSLY DRIVEN VEHICLES

FIELD OF THE INVENTION

This invention relates in general to driverless or autonomous vehicles, and more specifically to automobiles, trucks, and other specialty vehicles that operate out of controlled environments including open yard material handling systems that may experience adverse weather conditions.

BACKGROUND OF THE INVENTION

Sophisticated, human-capable vehicle robotics has been developed over the last 30 years, beginning with the pioneering work done in the Autonomous Land Vehicle (ALV) program funded by DARPA starting in the early 1980s. The earliest work was done at Carnegie-Mellon University, the Environmental Research Institute of Michigan (ERIM), MIT, Stanford Research Institute, and others, integrated into the DARPA Autonomous Land Vehicle prototype by Martin Marietta in Denver. Lowrie (1985) provides a good overview of the ALV and describes a vehicle control substantially the same as disclosure Smid et al. U.S. Patent Publication No. 2008/0262669 (2008). Kanade, Takeo, Thorpe, and Whittaker (1986) describe CMU contributions to ALV, which include a description of using 3D LADAR developed by ERIM as instrumental in obstacle detection and avoidance. Carmer, et al. (1996) reviews this technology from the perspective of 10 years of further work and understanding. Shafer, Stentz, and Thorpe (1986), Nasr, Bhanu, and Schaffer (1987). Turk et al (1987), Waxman et al. (1987), Asada (1988), Daily (1988), Dunlay (1988), and Turk et al. (1988) describe ALV and Navlab (a robotic vehicle developed in parallel to ALV as a Carnegie-Mellon testbed) basic architecture and parts of an autonomous driving vehicle, including roadway identification and following (lane keeping), path planning and replanning, obstacle detection and avoidance (heavily dependent upon 3D laser radar data to capture the three dimensional nature of obstacles), automotive controls (electric steer, speed control, etc.) and vehicle location (inertial and later GPS-based location estimation). This work discloses essentially all the features and architecture of subsequent work up through that reported in the DARPA Urban Challenge (2007 and 2008) and work presently being conducted by Google. The Wikipedia article "Autonomous Car" (per Dec. 23, 2012) provides a good alternative overview of this prior art. The salient aspect of this prior work is that it assumed good weather conditions (typically indoor testing and outdoor testing or demonstrations in dry clear weather, sometimes in the day and night, but not in rain, snow, or flooded conditions).

Later programs that followed ALV include Army Demo I, DARPA Demo II, and again Army Demo III. While the automated driving built under these programs improved, this improvement was less conceptual innovation and more that the base technology in 3 dimensional imaging, GPS, and computing power substantially improved so earlier architecture could be more successfully realized. These programs are review by Shoemaker (2006), the government's program manager for Demo I, part of Demo II, and initially Demo III—also by and Matsumura et al. (2000). Demo II (circa 1996) and III (circa 2001) included all aspects of a modern self-driving vehicle, including GPS/Inertial navigation, 3D computer vision and ladar obstacle detection and avoidance, route planning based on mission maps, WiFi-like radio network operated telemetry, and vehicle controls by wire (electronic speed, steering and other vehicle function controls). Everett et al. (1992), Chun et al. (1995), and Carmer et al. (1996) specifically describe aspects of how path planning, obstacle detection, and collision avoidance were done in these programs. In parallel to the work done in the US, German and EU funded work beginning with the pioneering high speed roadway driving demonstrations by Dickmanns et. al. (1985) and later in the 1980s show this technology in the civilian setting on German roadways (in contrast to the ALV and Demos I-III work in the US which focused on off-road and over less developed roads). The Army and DARPA Demos I, II, and III focused on off-road driving, but also in dry and favorable weather conditions. The European work focused more on road and lane driving, but also during good weather conditions.

Perhaps the capstone in the effort to develop automated vehicles was the DARPA Grand Challenges, culminating in 2007 with the Urban Challenge (DARPA 2007). In this highly publicized challenge, 35 semifinalists were tested in Victorville, Calif. in November of 2007. Over twenty substantially met DARPA's automated driving criteria which included the following:

California driving rules (DARPA Rules Section 5.5.1),
speed limit controlled driving (DARPA Rules Section 1.7 "adherence to speed limits"),
per lane position keeping (DARPA Rules Section 1.7 "Follow paved and unpaved roads and stay in lane"),
proper position relative to other vehicles on the road (DARPA Rules Section 1.7 "Change lanes safely when legal and appropriate, such as when passing a vehicle or entering an opposing traffic lane to pass a stopped vehicle. Vehicles must not pass other vehicles queued at an intersection") and (DARPA Rules 5.2.3, B.4 "maintaining a minimum spacing equal to the forward vehicle separation distance"),
proper right of way behavior at intersections (DARPA Rules 5.2.3 B2. "Intersection precedence," 5.2.5 D.2 "Merge," and D.4 "Left turn"),
speed merge and passing (DARPA Rules 5.2.2 A.10 "Leaving lane to pass" and A11. "Returning to lane after passing")
general route planning to a mission specification (DARPA Rules 5.2.4 C4 "Dynamic Planning"), and
route execution with dynamic obstacle detection and avoidance (DARPA Rules C.2 "demonstrates ability to negotiate obstacle field safely"), and operating under conditions of variable or non-performance of GPS (DARPA Rules 5.2.4 C.6 "GPS Outage").

In the late 1990s and early 2000s, work began on practical robotic vehicle applications including material handling platforms. Like prior work, these developments focused on single vehicle navigation using sensor (usually computer vision) feedback and assumed good environmental or weather conditions (which prevail inside buildings). The challenge for lift truck navigation systems is that they operate primarily indoors and therefore cannot know their location accurately through the method exploited extensively in outdoor vehicles, namely fusion of sensors with precision GPS. Indoor alternative absolute location determining methods must be used. Fabrizio et al. (1997) EP 0800129 B1 discloses an industrial lift truck with manual and driverless automated operation. This truck includes gyroscope, odometer (wheel revolution counting) and a computer vision sensor to determine location. This approach is further detailed in later publications to describe automated engagement of pallets. Further description of these computer vision-based sensors is given in EP 0712697 (1996) and U.S. Pat. No. 5,812,395 (1998). Pages et al. (2001—three references) describes using computer vision to locate the lift relative to a pallet. This work, like most of the work that follows, did not consider the significant variability possible in pallets and their respective loads, but did show proof of concept on a single type of demonstration pallet.

In 2005, Kelly et al. U.S. Pat. No. 6,952,488 describes a computer vision approach to identifying pallets or racks applied to robotic forklift control. Bröse et al. (2006) in German patent DE102004047214 disclose using 2D and 3D data extracted by computer vision to detect landmark objects for use as guide posts. As disclosed these are specialized fiducials consisting of posts or other objects. Seelinger (2006) discloses a vision guidance-based approach to pallet engagement but does not further elaborate autonomous guidance except to say that the work applies to wire guided AGV systems (Automated Guided Vehicles—these typically follow stripes on the floor or guide wires buried in the floor that define the drive path). In U.S. Patent Publication 2007/0018811, Gollu describes a system for determining vehicle location tracking based on the object identification at known locations. This is the inverse of most of the prior references that locate objects relative to the vehicle.

U.S. Pat. No. 7,376,262 to Hu et al. (2008) describe a method that fuses image-based feature matching and 3D laser scanning with inertial sensors and GPS measurements to determine position of a robotic vehicle. The general concept of this approach has been thoroughly studied and disclosed in the automated vehicle community at least back to the mid 1980s (see earlier background reviewed) but like many disclosures, publications, and patents subsequent to that period, the specific method described was deemed to be unique especially describing in detail how this particular system fused image derived features with other location determining devices. U.S. Pat. No. 7,440,585 to Roh et al. (2008) describes an autonomous vehicle with an architecture like that of the ALV (1980s), Navlab (1980s), Demo II (mid 1990s), and Demo III (2001) that uses consecutive images to obtain a 3D target position from 3D fiducial features.

In 2009, Armesto et al., Bouguerra, et al., Moore et al., Tamba, et al., each describe alternative computer vision—based guidance approaches to forklift navigation. Tamba implements controls over a Clark lift truck that uses encoder, gyros, and odometer to determine estimates of relative motion and laser range finder, computer vision, and sonar to determine measurement relative to the absolute surrounding environment. Tamba shows many specific control laws that could be used and provides parametric performance curves of location determination using the particular location fusion approach disclosed. Moore describes a SLAM (Simultaneous Localization and Mapping) approach that utilizes a Tamba or Grand Challenge vehicle equivalent sensor suite. Moore's approach as described as the basis of MIT Urban Grand. Challenge vehicle and a later MIT developed automated forklift based on a Toyota model.

The previous review clearly shows the general technology of autonomous driving of vehicles and the specific case of automatically driving material handling vehicles or lift trucks. The basic architecture of the automated vehicle was set early in the 1980s and publically disclosed widely. Specialization of the technology to material handling trucks has been widely developed and also reported both in the patent literature of the US and Europe and Asia.

Nearly all of the core technology, methods and architectures supporting automated driving were developed and disclosed in the 1980s and refined in the 1990s under European Union and U.S. Government funded and publically disclosed programs. As such, this technology is substantially in the public domain. The DARPA Urban Challenge was proof of technology readiness, and a further public disclosure (through papers openly published by all of the semifinalist the teams in 2007 and 2008). The Urban Challenge was a milestone, showing that practical applications of human-safe automated driving were possible at the current state of the art. Notably, however, the demonstrations in California in 2007 were performed in dry desert weather conditions (no snow, running water, ice, or fog/dust). Refinements—including autonomous operation under a variety of inclement weather conditions—have yet to be implemented or perfected.

SUMMARY OF THE INVENTION

This invention improves upon existing autonomously driven vehicles by providing apparatus and methods enabling such vehicles to operate in rain, snow and other adverse weather conditions. Such an "all-weather" autonomously driven vehicle includes a plurality of environmental sensors and an obstacle detection processor that receives signals from the sensors to determine the presence of obstacles and terrain variations along a route taken by the vehicle. A vehicle driving control unit is operative to steer and/or adjust the speed of the vehicle in accordance with the route and the obstacles and the terrain variations. One or more of the on-board vehicle sensors have incident fields of view (IFOV) or return beam diameters that are only intermittently blocked by rain, snow, dust or other obscurant particles. This allows the obstacle detection processor is to tell the difference between obstacles, terrain variations and obscurant particles, thereby enabling the vehicle driving control unit to disregard the presence of obscurant particles along the route taken by the vehicle.

The sensor having a beam that is only intermittently blocked by obscurant particles forms part of a laser detection and ranging (LADAR) system, RADAR system or video camera. The obstacle detection processor may receive information in the form of time-spaced frames divided into cells or pixels, whereby groups of connected cells or pixels and/or cells or pixels that persist over longer periods of time are interpreted to be obstacles or terrain variations.

The system may further including an input for receiving weather-specific configuration parameters to adjust the operation of the obstacle detection processor. The weather-specific configuration parameters may be manually supplied, available for selection by a driver, or automatically detected by measuring temperature, precipitation, atmospheric clarity or other ambient conditions.

The system may further including a terrain grading system to determine physical characteristics associated with positive and negative obstacles that the vehicle is allowed to traverse without invoking obstacle avoidance behavior. Such physical characteristics may include an obstacle depth and width threshold, d and w, as well as an input for receiving weather-specific configuration parameters to adjust d and w based upon weather conditions or soil type.

The vehicle driving control unit may be further operative to adjust vehicle stopping distance as a function of weather-based reduced tire-terrain surface friction, and steer or adjust the speed of the vehicle as a function of visibility due to obscurant density.

DETAILED DESCRIPTION OF THE INVENTION

An autonomous driving system requires five basic capabilities:

(1) It has to know where things are and where it needs to go. This is typically provided in the form of a road or mission map ("map" for short) and checkpoints defining destinations (locations defined in the world on the map). The autonomy software plans routes from starting points to checkpoints through roads (legal mapped paths, represented as a list of way points) or zones (defined as areas through which any path can be taken that does not collide with an obstacle);

(2) It has to be capable of sensing where it is reliably in the environment (location in a driving lane, location along a road, location in the world, location relative to the map);

(3) It has to be able to sense and locate (relative to itself) objects to which it must react. These include impassible obstacles not already known from inclusion in the map (paths blocked, zones disallowed for driving, fallen trees, etc.), Also dynamic objects that move around in the world and can block planned paths (examples include other vehicles, traffic flow devices that change, people, and animals);

(4) It has to have a driving control system that reads and utilizes the data from sensors, understands the maps and how to plan or modify paths, understands how to generate detailed correct driving and safe vehicle behaviors in a timely manner, operates the vehicle driving control interfaces (steering, acceleration, braking), and has to be adaptive to vehicle and driver dynamics (i.e. each vehicle type responds differently and each driver has a preference or driving style the is safe and driver comfortable); and (5) It must be able to fail in a controlled manner when driving conditions exceed its capabilities.

This invention focuses on how weather changes effect items (2), (3) and (5) and the method of implementation and operation of the sensors that localize the vehicle and locate obstacle under variable weather conditions.

To meet this challenge, we have developed a sensor suite and processing capability for allowing driverless vehicles to operate in fog, snow fall, rain, and deformable terrain (wheel ruts, erosion, etc.). The key insight is that the sensors not only detect the desired information (obstacle locations, terrain surface, road lanes, and locations), but also weather effects (falling snow flakes or rain, obscurants like fog or smoke) and ground deformations that may or may not be of consequence (i.e., ruts in the snow).

Figure 1:
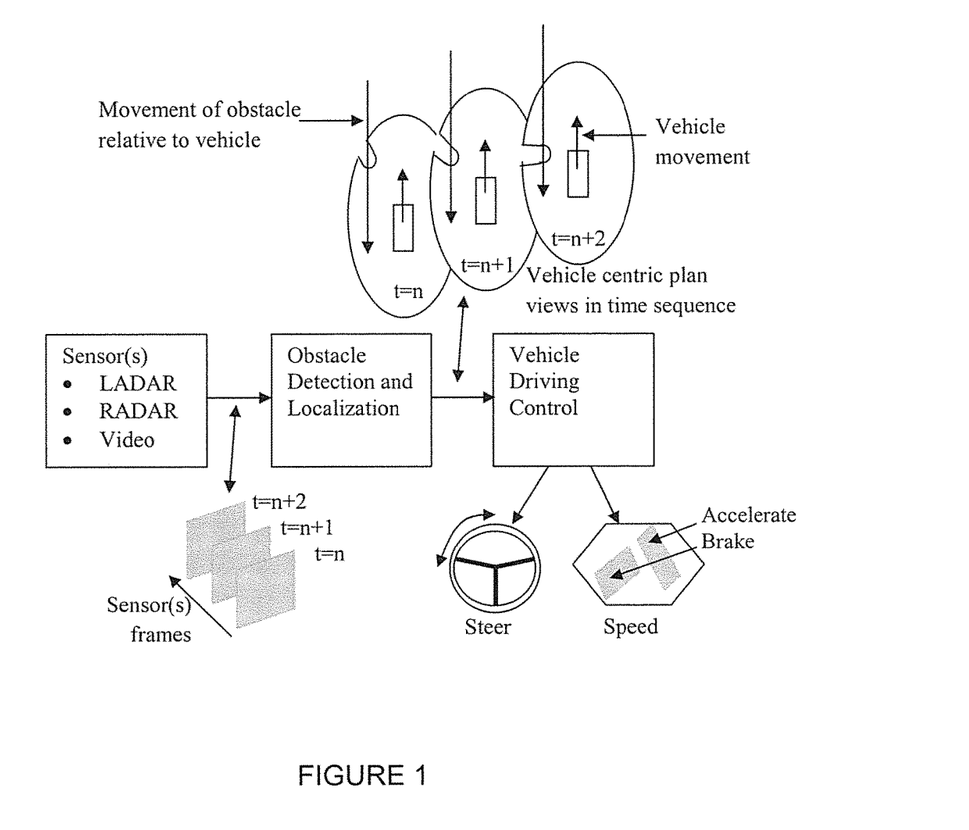
FIG. 1 shows the basic form of a sensor processing chain for a video or LADAR sensor in a prior art driverless vehicle system.

FIG. 1 shows the basic form of a sensor processing chain for a video or ladar sensor in a prior art driverless vehicles system. Sensor frames are captured in a periodic sequence (t=n, n+1, n+2). These frames have a 3 dimensional nature, i.e. a measurement value (or value tuple as in RGB) and a 3 dimensional measure (ladars provide a pixel x, y, range measurement relative to the sensor placement) or implied location (an RGB camera provides an x, y, and y can be used to approximate the range—alternatively a stereo camera pair can associate range with parallax).

The driverless vehicle converts the pixel locations to a vehicle centric plan view and estimates the size or height of obstacles to determine if they should be avoided. If so, the vehicle adjusts its drive path (the vehicle movement) to miss the obstacles or alternatively adapts speed to avoid collision (this might be to slow down or stop). Per the DARPA Urban Challenge rules, if the obstacle is a vehicle and the vehicle is in front moving not at all or slowly, a "go around behavior" that involves safe lane change and passing is elicited.

Figure 2:
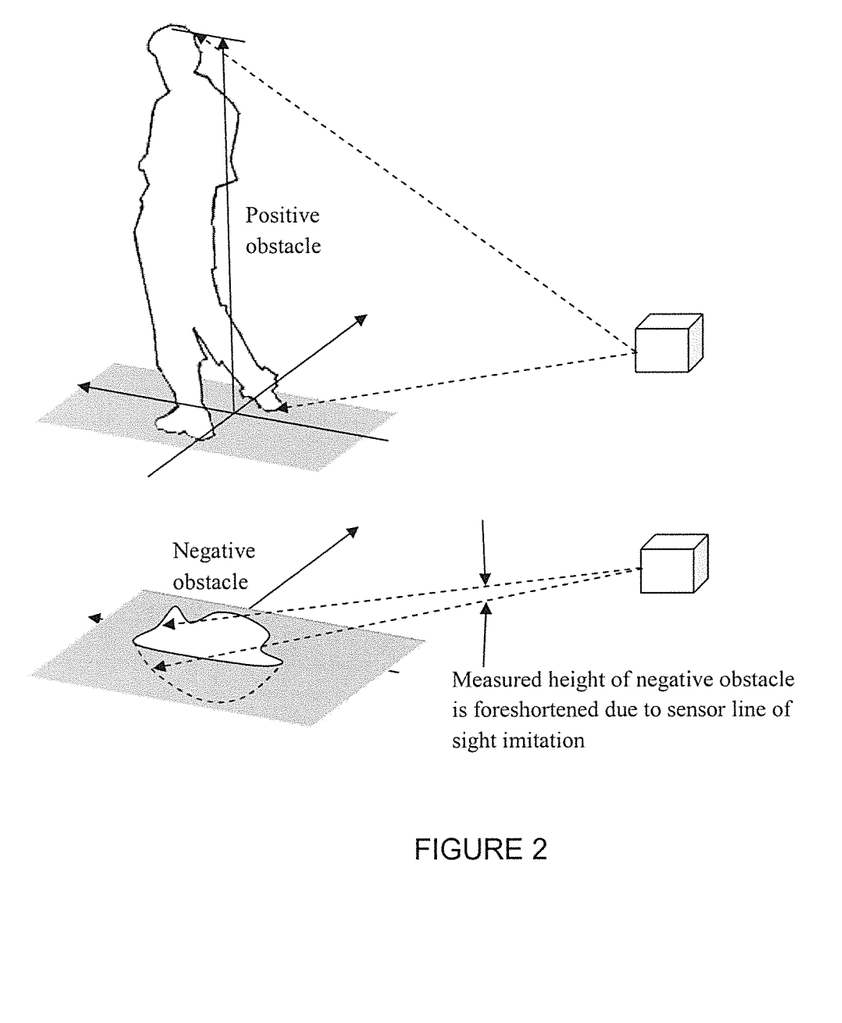
FIG. 2 illustrates how obstacles can be both excessively high or tall (positive obstacles) indicating that they should be avoided, but they can also be excessively deep as well (negative obstacles)

Per FIG. 2, obstacles can be both excessively high or tall (positive obstacles) indicating that they should be avoided, but they can also be excessively deep as well (negative obstacles). It has generally been observed (Larson 2011) that positive obstacles are easier to detect because their tops are visible to a line of sight sensor like a camera or a ladar. However, negative obstacles are harder to detect because while the sensor may detect the opening diameter of the hole, the actual bottom of the hole is not normally visible by line of sight until the sensor is practically on top of the hole.

In either case, in the prior art, it has been assumed that the sensor sees the obstacle or the ground except perhaps for sensor specific noise or erroneous readings. For instance, a ladar might read an erroneous range if a surface is non-reflective or tilted substantially way from the sensor line of sight. Sometimes a reading is erroneous if it slightly clips an edge, returning some incident energy but not enough for a reliable reading. Similarly, a camera might have faulty readings due to saturation (too much light) of underexposure (not enough light) of some of its pixels.

In the case of inclement weather, an external obscurant interferes with this assumption:

Rain drops obscure light reflected from the obstacle or ground. It reflects prematurely light emitted from a sensor, generating early or shortened measurements.

Snowflakes, much like rain drops obscure light reflected from the obstacle or ground and also reflect emitted light in line of sight with the sensor.

Fog or other particulate obscurants block light reflected from the ground or objects, but provide a degree of opacity to light that is shined onto the cloud, effectively creating a blurring of the obstacles or terrain beneath or on the other side of obscurant.

The degree to which these effects occur is dependent on the obscurant particle size and the corresponding wavelength of the energy which is used for measurement. A RADAR wave which is physically large (automotive radar at about 77 GHz has a wavelength of 4 millimeters in air) can operate successfully through most snow, rain or dust without substantial effect because the wavelength is much longer than the obscurant particles. One the other hand visible and near visible light (CCD cameras and ladars) operate at about 500 THz or a wavelength in the 400 to 900 urn size range. These waves are easily blocked by snow, rain and most obscurants.

Thus, one solution to navigate through rain or snow would be to use RADAR. However, another phenomenon makes that problematic. There is a well known relationship between beam width (or collimation) and frequency which can be written as ½ power beam width=k×ψ/D. The term k is a constant based on antenna type and can be estimated as 70 degrees, ψ is wavelength, and D is antenna diameter. For the RADAR example, this would be 70×4 mm/100 mm=~3 degrees. As a distance of 100 meters a three degree beam could resolve a 5 meter object, or one about the size of a car. This works for anti-collision RADAR, but does not exhibit sufficiently high resolution to reliably detect people, pot holes, or even debris in the road.

Figure 3:
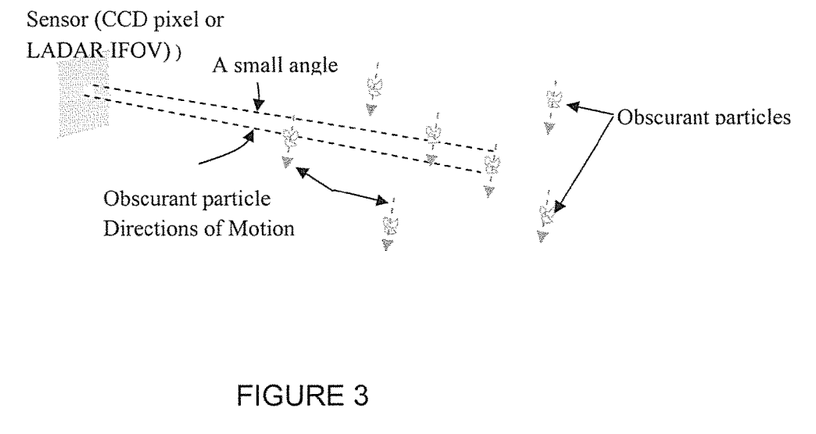
FIG. 3 shows that when the optical path used for a measurement is intermittently blocked by an obscurant, the blockage is dynamic and rapidly changes over each measurement location.

The preferred embodiment therefore uses optical sensors that have acceptable collimation but are actually more easily blocked by obscurant particles like rain, snow or dust. In accordance with the invention, the optical path used for each measurement is intermittently blocked by the obscurant, this blockage is dynamic and rapidly changes over each measurement location (FIG. 3). Also, the blockages subtend a small angle so that they are visible in the measurement data as very small objects that can be ignored. As such, image processing algorithms can be built that filter out erroneous measurements, leaving actual obstacles and ground data by removing data items that are not persistent (i.e. they show up in one frame of data but not the next) or they are not large enough to matter to a moving vehicle (i.e. they do not represent obstacles large enough to cause vehicle damage or cause harm to pedestrians).

Figure 4:
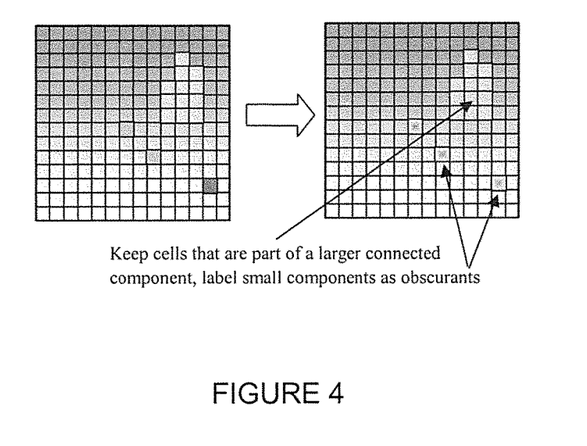
FIG. 4 depicts a speckle filter that removes small objects by determining their connected sizes or diameters.
Figure 5:
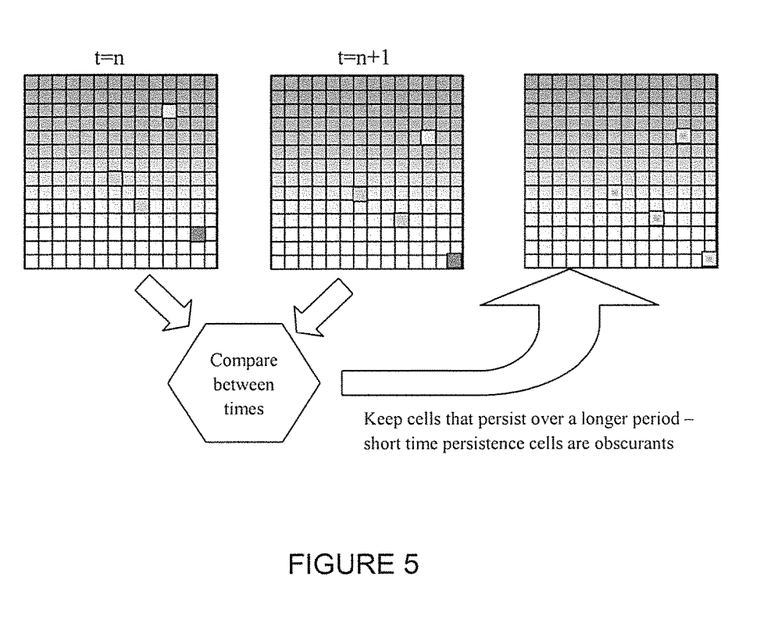
FIG. 5 depicts a speckle filter that removes small objects that are moving and intermitted frame to frame.

The preferred approach is essentially a speckle filter that removes small and intermittent objects by (a) determining their connected sizes or diameters (FIG. 4), and (b) by comparing target pixels (pixels that indicate presence of an object near enough to the moving vehicle to require some kind of reaction) to the previous frame (frames, FIG. 5) to see if these objects are persistent (which they need to be if they are real as opposed to moving obscurants).

Figure 6:
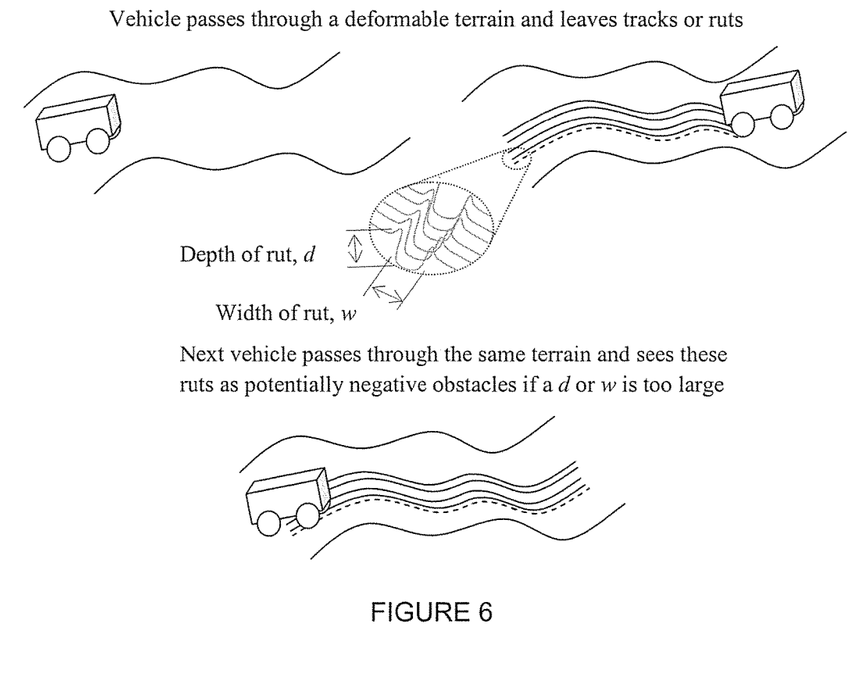
FIG. 6 depicts another innovation used to accommodate weather and changing ground conditions which is based on the realization that passing over a portion of terrain can cause terrain deformation.

Another innovation used to accommodate weather and changing ground conditions is based on the realization that passing over a portion of terrain can cause terrain deformation (FIG. 6). Sufficiently deep tracks or holes in the ground will cause a vehicle to become stuck, but smaller ones made from deformable material (like soft moisten soil or snow) can be driven through without difficulty, depending on the characteristics of the vehicle drive and traction train. In our preferred embodiments, we implement a depth and width threshold, d, and w, which are environment and weather adjustable so that the size of maximum "holes" can change with the soil type and weather.

Figure 7:
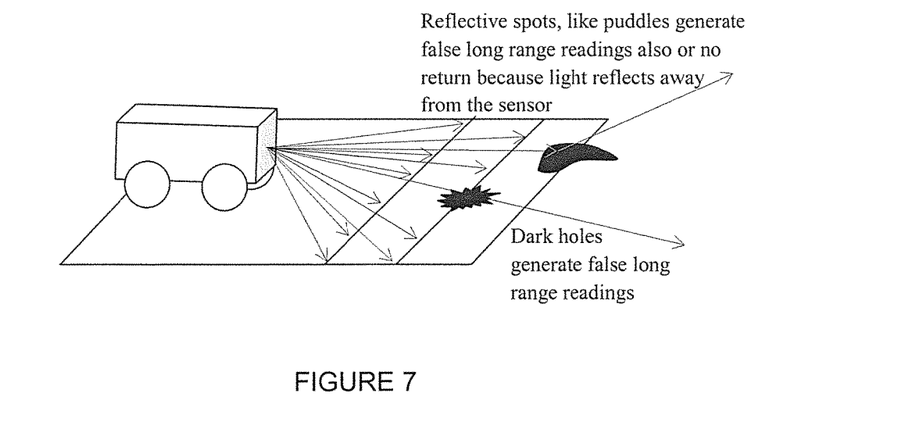
FIG. 7 illustrates how the sensor(s) often "see" the reflective majority of the ground but some small very deep "holes" in the ground that can be filtered or removed by similar methods as described in FIGS. 4 and 5, but applied to objects at or below the ground plane.

Sometimes this effect also leads to the identification of deep and small diameter negative objects that are due to high reflectivity of the weather related ground cover (snow) and low reflectivity pavement or no-reflectivity small pools of water. In this case, the sensor(s) often "see" the reflective majority of the ground but also small very deep "holes" in the ground that can be filtered or removed by similar methods as described in FIGS. 4 and 5, but applied to objects at or below the ground plane (FIG. 7).

Figure 8:
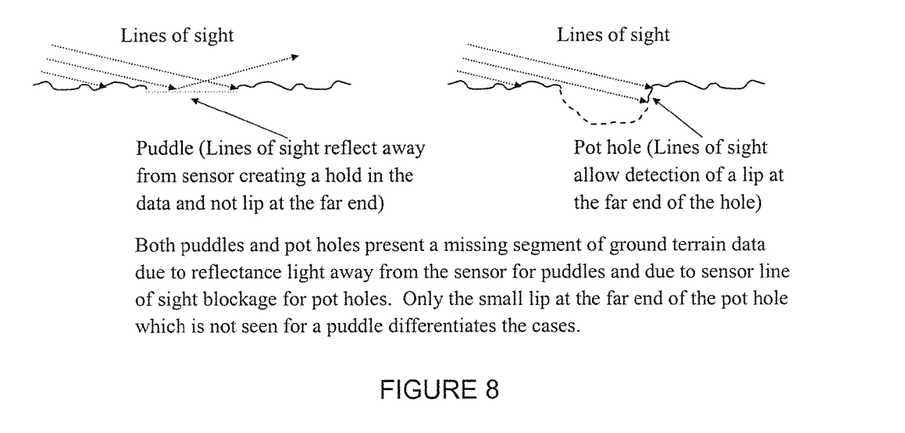
FIG. 8 illustrates one of many difficult to discriminate weather vs. ground terrain variational cases that affect how obstacles are detected and characterized for automated vehicle avoidance.

As shown in FIG. 8, differentiating a puddle from a pot hole is subtle. Both puddles and pot holes present a missing segment of ground terrain data due to reflectance light away from the sensor for puddles and due to sensor line of sight blockage for pot holes. Only the small lip at the far end of the pot hole which is not seen for a puddle differentiates the cases. There are many other similar cases that can cause confusion so at least some of the parameters set into the obstacle detection and localization system that are environmental and weather conditional have to provide the system a means to choose among alternative interpretations based on weather and maximum vehicle, passenger, and pedestrian safety.

Another important aspect of the invention is to modulate driving speed with observed visibility. The distance and quality of visibility in the optical driving sensors per FIG. 3, is directly related to the amount of the visual frame data that is being eliminated due to processing like that described in FIGS. 4 and 5. As one eliminates obscurants due to their persistence and size, one is also eliminating potential obstacles of a certain size beyond a certain range. Therefore, based on the maximum range that an obstacle can be detected exhibiting these minimum size parameters, the vehicle driving control must slow down (so that the vehicle's emergency stopping distance is not exceeded relative to the range to the detected obstacle). With no visibility (all visual obstacle data is blocked by obscurants), the vehicle has to completely stop (and for practical cases, the vehicle will have to stop or pause autonomous operation when visibility fall below some safe threshold of visibility).

Furthermore, for some weather conditions (like ice and snow) one must also take into account that vehicle stopping distance for any given forward speed will be longer due to reduced tire-terrain surface friction. Under idealize road conditions (Cyberphysics 2014)(BBC 2014)(Queensland 2014) and (US Federal Highway Administration 2014) provide guidance as applied to the typical passenger car or light truck. Under icing and rain conditions (BBC 2013) and (Winterservice 2014) provide guidance, but we suggest to the designer of autonomous driving that these figures and tables should be check by experiment for any particular autonomous vehicle design.

Figure 9:
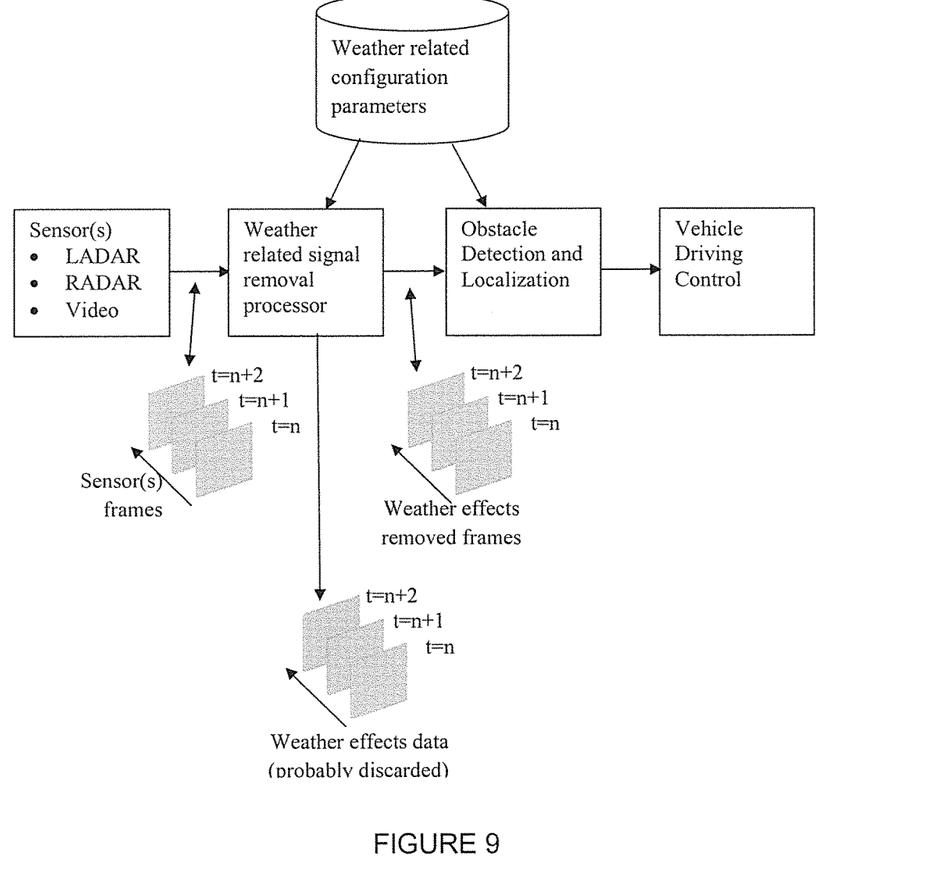
FIG. 9 discloses how this invention adds additional blocks to the sensor processing in an autonomously driven vehicle, including a module that accepts as input the sensor(s) frames and processes them with weather/obscurant identification algorithms including but not limited to the ones already described and separates out weather related effects from terrain, navigation and obstacle-related effects.

Referring back to FIG. 1, this invention discloses adding an additional blocks to the sensor processing change as shown in FIG. 9. The key sensor processing element is a module that accepts as input the sensor(s) frames and processes them with weather/obscurant identification algorithms including but not limited to the ones already described and separates out weather related effects from terrain, navigation and obstacle-related effects. Generally, as shown in the diagram, the weather effects would be identified, removed, and discarded.

Because weather is variable and also changes some of the parameters used to detect and determine the safety of traversal of certain ground features (like ruts in the snow or mud), a weather type set of configuration or threshold parameters are required and selected based on weather type. As shown, these parameters change some of the decision behaviors of the weather effects removal preprocessing module, and also the obstacle detect and localization module.

These weather parameters can be manually supplied by a developer or made available for selection by a driver or automatically detected by measuring certain aspects of the weather including but not limited to temperature, precipitation, atmospheric clarity (i.e., how far it is possible for a sensor to see through the air).

The invention claimed is:

1. An all-weather autonomously driven vehicle, comprising:
   a plurality of environmental sensors disposed on the vehicle;
   an obstacle detection processor receiving signals from the sensors to determine the presence of obstacles and terrain variations along a route taken by the vehicle;
   a vehicle driving control unit operative to steer or adjust the speed of the vehicle in accordance with the route and the obstacles and the terrain variations detected by the obstacle detection processor;
   wherein one of the sensors is an optical sensor operative to detect wavelengths in the visible or near-visible region of the spectrum, and wherein the optical sensor has a sensing beam defined by a small angle of view enabling the optical sensor to detect obstacles and obscurant particles including rain and snow particles along a route taken by the vehicle; and
   wherein the obstacle detection processor receives frames of data over time from the optical sensor, and wherein the obstacle detection processor is operative to discern the difference between obstacles, terrain variations and obscurant particles by disregarding obscurant particles detected by the optical sensor that (a) are smaller than a size threshold and/or (b) do not persist between the frames of data, thereby enabling the vehicle driving control unit to disregard the presence of obscurant particles along the route taken by the vehicle.

2. The all-weather autonomously driven vehicle of claim 1, wherein the optical sensor operative to detect the obscurant particles forms part of a laser detection and ranging (LADAR) system.

3. The all-weather autonomously driven vehicle of claim 1, wherein at least one of the environmental sensors disposed on the vehicle other than the optical sensor is a radio detection and ranging (RADAR) system.

4. The all-weather autonomously driven vehicle of claim 1, wherein the sensor operative to detect the obscurant particles forms part of a video camera.

5. The all-weather autonomously driven vehicle of claim 1, wherein:
   the obstacle detection processor receives information in the form of time-spaced frames divided into cells or pixels; and
   groups of connected cells or pixels are interpreted to be obstacles or terrain variations.

6. The all-weather autonomously driven vehicle of claim 1, wherein:
   the obstacle detection processor receives information in the form of time-spaced frames divided into cells or pixels; and
   cells or pixels that persist over longer periods of time are interpreted to be obstacles or terrain variations.

7. The all-weather autonomously driven vehicle of claim 1, wherein the vehicle driving control unit is further operative to adjust vehicle stopping distance as a function of weather conditions.

8. The all-weather autonomously driven vehicle of claim 1, wherein the vehicle driving control unit is further operative to steer or adjust the speed of the vehicle as a function of visibility due to obscurant density.

9. The all-weather autonomously driven vehicle of claim 1, further including an input for receiving weather-specific configuration parameters to adjust the operation of the obstacle detection processor.

10. The all-weather autonomously driven vehicle of claim 9, wherein the weather-specific configuration parameters are manually supplied.

11. The all-weather autonomously driven vehicle of claim 9, wherein the weather-specific configuration parameters are made available for selection by a driver.

12. The all-weather autonomously driven vehicle of claim 9, wherein the weather-specific configuration parameters are automatically detected by measuring temperature, precipitation, atmospheric clarity or other ambient conditions.

13. The all-weather autonomously driven vehicle of claim 1, further including a terrain grading system to determine physical characteristics associated with positive and negative obstacles that the vehicle is allowed to traverse without invoking obstacle avoidance behavior.

14. The all-weather autonomously driven vehicle of claim 13, wherein the physical characteristics include an obstacle depth and width threshold, d and w.

15. The all-weather autonomously driven vehicle of claim 14, further including an input for receiving weather-specific configuration parameters to adjust d and w based upon weather conditions or soil type.

16. An all-weather autonomously driven vehicle, comprising:
   an optical sensor mounted on the vehicle, the optical sensor including an image sensor comprising a two-dimensional array of cells or pixels;
   wherein the optical sensor has a narrow angle of view enabling the image sensor to detect obstacles and obscurant particles including rain and snow particles along a route taken by the vehicle;
   an obstacle detection processor receiving images from the sensor array in the form of frames of data taken along the route that are spaced apart in time;
   wherein the obstacle detection processor is operative to discern the difference between obstacles and obscurant particles using one or both of the following rules:
   (a) obscurant particles are smaller than obstacles based upon the number of cells or pixels that the particles and obstacles respectively block on the image sensor; and
   (b) obscurant particles intermittently block different cells or pixels from frame to frame as the particles pass through the narrow angle of view of the optical sensor, whereas obscurant particles persist from frame to frame; and
   a vehicle driving control unit operative to steer or adjust the speed of the vehicle in accordance with the route and the obstacles detected by the obstacle detection processor while disregarding the obscurant particles.

17. The all-weather autonomously driven vehicle of claim 16, wherein the optical sensor is a video camera.

18. The all-weather autonomously driven vehicle of claim 16, wherein the obstacle detection processor is further operative to detect obstacles in the form of terrain variations.

19. The all-weather autonomously driven vehicle of claim 16, further including an input for receiving weather-specific configuration parameters to adjust the operation of the obstacle detection processor.

20. The all-weather autonomously driven vehicle of claim 16, wherein the vehicle driving control unit is further operative to steer or adjust the speed of the vehicle as a function of visibility due to obscurant density.

\* \* \* \* \*

UNITED STATES PATENT AND TRADEMARK OFFICE
CERTIFICATE OF CORRECTION

Page 1 of 1

PATENT NO. : 9,989,967 B2
APPLICATION NO. : 14/196189
DATED : June 5, 2018
INVENTOR(S) : Charles J. Jacobus et al.

It is certified that error appears in the above-identified patent and that said Letters Patent is hereby corrected as shown below:

On the Title Page

(72) Inventors, Line 3: After "(US)", add --Charles J. Cohen, Ann Arbor, MI (US)--

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*